Figure 1:
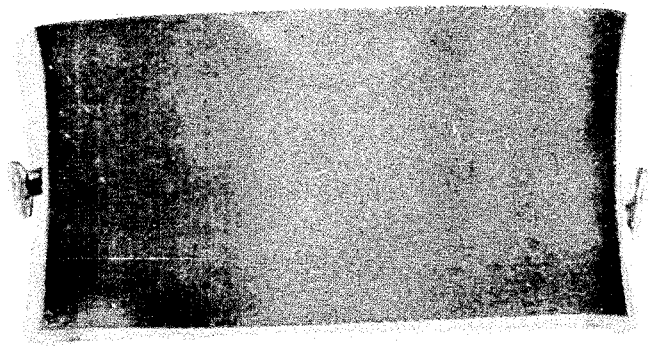
Figure 1:
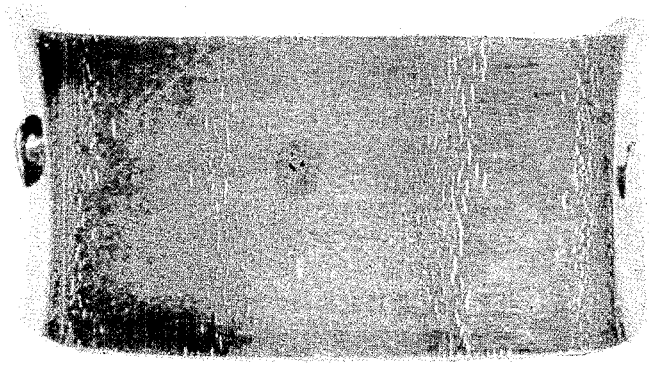

Jan. 6, 1959   R. H. ROSENWALD ET AL   2,867,604
ANTIOZIDATION OF RUBBER
Filed June 17, 1955                     4 Sheets-Sheet 1

N,N'-DIOCTYL-P-
PHENYLENE DIAMINE

N,N'-DIAMYL-P-
PHENYLENE DIAMINE

INVENTORS:
Robert H. Rosenwald
Joseph A. Chenicek
By:
Chester J. Giuliani
Bernard L. Kramer
ATTORNEYS:

Jan. 6, 1959

R. H. ROSENWALD ET AL 2,867,604

ANTIOZIDATION OF RUBBER

Filed June 17, 1955

4 Sheets-Sheet 2

CONTROL

N,N'-DIOCTYL-P-
PHENYLENE DIAMINE

N,N'-DINONYL-P
PHENYLENE DIAMINE

*INVENTORS:*
*Robert H. Rosenwald*
*Joseph A. Chenicek*
By:
*Chester J. Giuliani*
*Bernard L. Kramer*
*ATTORNEYS:*

Jan. 6, 1959  R. H. ROSENWALD ET AL  2,867,604
ANTIOZIDATION OF RUBBER
Filed June 17, 1955  4 Sheets-Sheet 3

N,N-DIPENTYL-p-PHENYLENEDIAMINE

N,N-DIOCTYL-p-PHENYLENEDIAMINE

INVENTORS:
Robert H. Rosenwald
Joseph A. Chenicek
By:
Chester J. Giuliani
Bernard L. Kramer
ATTORNEYS:

Jan. 6, 1959  R. H. ROSENWALD ET AL  2,867,604
ANTIOZIDATION OF RUBBER
Filed June 17, 1955  4 Sheets-Sheet 4

CONTROL

N,N' - DIHEPTYL - p - PHENYLENEDIAMINE

N,N' - DIOCTYL - p - PHENYLENEDIAMINE

N,N' - DIDECYL - p - PHENYLENEDIAMINE

INVENTORS:
Robert H. Rosenwald
Joseph A. Chenicek
By:
Chester J. Giuliani
Bernard L. Kramer
ATTORNEYS:

2,867,604
ANTIOZIDATION OF RUBBER

Robert H. Rosenwald, Western Springs, and Joseph A. Chenicek, Bensenville, Ill., assignors to Universal Oil Products Company, Des Plaines, Ill., a corporation of Delaware Application June 17, 1955, Serial No. 516,226

14 Claims. (Cl. 260—45.9)

This application is a continuation-in-part of our copending application Serial No. 375,278, filed August 19, 1953, now abandoned, and relates to the antiozidation of rubber.

Synthetic rubber and particularly GR–S rubber (copolymer of butadiene and styrene) undergoes cracking when exposed to ozone, with the result that the rubber is unsatisfactory for use and must be replaced. While this phenomenon of ozone cracking is particularly detrimental to synthetic rubber, it also occurs in natural rubber. Thus, the present invention is particularly directed to preventing ozone cracking of synthetic rubber but it is understood that it also is useful in preventing ozone cracking in natural rubber.

It is only comparatively recently that the cracking of rubber has been recognized as being caused by ozone. The presence of ozone in the atmosphere appears to be increasing, apparently due to increased installations of high tension power equipment and the release of industrial and automotive combustion vapors into the atmosphere. Because of the increased cracking of rubber, the problem has been studied extensively by many investigators. One approach to the problem has been the study of antioxidants normally used to prevent deterioration of organic compounds due to oxygen. However, it was found that the known antioxidants are unsuitable for this purpose because of impotency, toxicity and sensitivity or because of excessive fugacity.

Many additives which will retard oxidation reactions in rubber are not effective in preventing ozone cracking and, in some cases, actually promote ozone attack. Therefore, such additives cannot be employed for this purpose. Furthermore, certain additives which are antioxidants at low concentrations are ineffective and in some cases actually become pro-oxidants at the higher concentrations which would be required for use in rubber. While additives which are toxic and sensitizers can be used satisfactorily in other substrates, such as gasoline, fuel oil, etc., these additives cannot be used in rubber which is handled by men working with such materials because of the harmful effects. Still further, the fugacity or migration of the additive presents a new and different problem than heretofore encountered with antioxidants. The cracking of rubber by ozone is a surface reaction and, therefore, it is necessary that a satisfactory antiozidant possesses the correct properties of fugacity so that it will migrate to the surface of the rubber and thereby prevent ozone attack. On the other hand, oxygen in air usually is dissolved or entrained in many organic compounds and, therefore, it is important that the antioxidant remain within the substrate in order to prevent oxidation reactions therein.

From the above description, it is apparent that the cracking of rubber due to ozone is a different problem than oxidative deterioration reactions. This different problem requires a novel solution, and the present invention provides a novel method of retarding and/or preventing ozone cracking.

In a specific embodiment, the present invention relates to a method of preventing the cracking of rubber due to ozone which comprises incorporating therein from about 1 to about 5% by weight of N,N'-di-sec-octyl-p-phenylene diamine.

In another specific embodiment, the present invention relates to a method of preventing the cracking of rubber due to ozone which comprises incorporating therein from about 1 to about 5% by weight of N,N'-di-sec-nonyl-p-phenylene diamine.

In accordance with the present invention, rubber and rubbery products are stabilized against ozone cracking by incorporating therein an antiozidative amount of a di-substituted-p-phenylene diamine of a particular composition. The use of the particular di-substituted-p-phenylene diamines of the present invention offers numerous advantages. In the first place, they are the most effective antiozidants in rubber. Secondly, they are non-toxic and, therefore, may be used in rubber which contacts food products and also may be handled by workers without harmful toxic or sensitivity effects. Furthermore, the novel antiozidants of the present invention are water insoluble and, therefore, will not be lost during washing of the rubber or contact thereof with water. Still further, the antiozidants of the present invention possess the desired properties of fugacity and, therefore, will serve to prevent ozone attack at the surface of the rubber but are not too volatile that they will be lost during periods of use at high temperatures.

It is preferred that the aliphatic substituents be of secondary configuration; that is, the aliphatic substituent is attached to the nitrogen atom on a carbon atom other than a terminal carbon atom of the aliphatic substituent. Preferred compounds thus comprise N,N'-di-sec-octyl-p-phenylene diamine, N,N'-di-sec-nonyl-p-phenylene diamine, N,N'-di-sec-decyl-p-phenylene diamine, N,N'-di-sec-undecyl-p-phenylene diamine and N,N'-di-sec-dodecyl-p-phenylene diamine. It also is preferred that the longer chain of the aliphatic substituent be substantially straight chain and at the most only of mild branching. The preferred compounds may be illustrated by the following general formula:

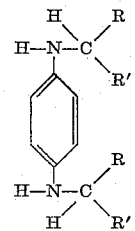

where R is a hydrocarbon radical containing from 1 to 2 carbon atoms and R' is a hydrocarbon radical containing from 6 to 10 carbon atoms and preferably is of substantially straight chain arrangement. For example, a preferred antiozidant comprises N,N'-di-(1-methylheptyl)-p-phenylene diamine. It will be noted that in this compound the aliphatic substituent is attached to the nitrogen atom at the second carbon atom and thus this compound also can be named N,N'-di-(2-octyl)-p-phenylene diamine. Another preferred antiozidant comprises N,N'-di-(1-ethyl-3-methylpentyl)-p-phenylene diamine. It will be noted that the aliphatic substituent is attached to the nitrogen atom at the third carbon atom and that it contains a methyl group attached to the fifth carbon atom, so that this compound also can be named N,N'-di-3-(5-methylheptyl)-p-phenylene diamine.

The novel antiozidant of the present invention may be prepared in any suitable manner. These antiozidants conveniently are prepared by reductive alkylation of p-nitro-aniline or p-phenylene diamine with a ketone or aldehyde. The ketone or aldehyde utilized in preparing these compounds is selected to give the desired configuration of the aliphatic group and the desired point of attachment thereof to the nitrogen atom of the phenylene diamine. For example, N,N'-di-(1-ethyl-3-methylpentyl)-p-phenylene diamine is prepared by the reductive alkylation of p-phenylene diamine or p-nitro-aniline with 5-methyl-3-heptanone (also named ethyl isoamyl ketone), and N,N'-di-(1-methylheptyl)-p-phenylene diamine is prepared by reductive alkylation using 2-octanone as the ketone, etc. Similarly, N,N'-di-(1-methyloctyl)-p-phenylene diamine is prepared by reductive alkylation utilizing 2-nonanone as the ketone, and N,N'-di-(1-ethylnonyl)-p-phenylene diamine is prepared by reductive alkylation utilizing 3-undecanone as the ketone, etc. These specific preparations illustrate the manufacture of some of the preferred antiozidants of the present invention but it is understood that other suitable antiozidants may be prepared by this general method.

A particularly preferred catalyst for effecting the reductive alkylation reaction comprises a mixture of the oxides of chromium, copper and barium, although other suitable catalysts may be employed. Other catalysts include those containing cobalt, nickel, platinum, palladium, molybdenum, etc. In general, the reaction is effected at an elevated temperature of from about 100° to about 250° C. and a hydrogen pressure of from about 5 to about 200 atmospheres.

The antiozidant of the present invention is incorporated in rubber or rubbery products in any suitable manner and at any suitable stage of preparation. In general, the antiozidant is utilized in an amount of from about 1% to about 5% by weight of the rubber, although in some cases, higher concentrations, which may range up to 10% or lower concentrations, which may be as low as 0.001% by weight, may be employed. These concentrations are based on the rubber hydrocarbon exclusive of the other components of the final rubber composition, and are used in this manner in the present specification and claims. It is understood that the antiozidant of the present invention is utilizable along with other additives incorporated in rubber for specific purposes including antioxidants, accelerators, softeners, extenders, wax, reinforcing agents, etc.

The antiozidant of the present invention normally is employed along with certain commercial antioxidants which are incorporated in the latex prior to milling with the other components of the rubber. In this embodiment, the antiozidant of the present invention thus is used along with a separate antioxidant. Any suitable antioxidant may be employed including, for example, phenyl-beta-naphthylamine, 6-phenyl-2,2,4-trimethyl-1,2-dihydroquinoline, marketed under the trade name of "Santoflex-B," 2,2'-methylene-bis-(4-methyl-6-tert-butylphenyl), 2,6-di-tert-butyl-p-cresol, the reaction product of acetone and diphenylamine, marketed under the trade name of "B. L. E.," etc. These antioxidants generally are used in a concentration from about 0.5% to about 3% by weight of the rubber.

As hereinbefore set forth, the antiozidant of the present invention also normally is employed along with paraffin and/or microcrystalline wax. The wax generally is utilized in a concentration of from about 0.5 to about 3% by weight of the rubber.

In one embodiment, the antiozidant of the present invention is admixed with the antioxidant and/or the wax, and the mixture then is composited with one or more of the other components of the rubber composition.

The antiozidant of the present invention can be utilized in any rubber composition subject to ozone cracking and particularly GR–S rubber, including those used for automobile tires and tubes, hose, belting, sheet and thread rubber, rubberized fabrics, molded goods, boots and shoes, etc., whether vulcanized in a mold, in open steam, in hot air, or in the cold by the so-called acid process.

In another embodiment, the present invention can be utilized for the stabilization of adhesives, elastomers, etc., which tend to crack due to ozone. When the antiozidant is added to a liquid, such as rubber pigment or an oil, it is dissolved therein in the desired proportions. When it is to be added to a solid substrate, it is incorporated therein by milling, mastication, etc. The additive may be utilized as such or as a solution or dispersion, or as a powder, paste, etc.

It is understood that the invention includes the stabilization of both natural and synthetic rubber, including those produced by the reaction of butadiene and styrene (GR–S), butadiene and acrylonitrile (Buna N), butadiene and isobutylene (Butyl rubber), etc., as well as reclaims and latices of rubbery materials, whether or not admixed with fillers, pigments, accelerating agents, etc. It is well-known that rubbers are polymers of conjugated 1,3-dienes, either as polymers thereof or as copolymers thereof with other polymerizable compounds, and are so referred to and used in the present specifications and claims.

As hereinbefore set forth, the ozone cracking appears to be particularly detrimental to butadiene-styrene copolymer rubber, referred to in the art as GR–S rubber. However, other synthetic rubbers undergo ozone cracking to different and usually lesser extents. Other synthetic rubbers include Thiokol rubber, silicone rubber, neoprene rubber, etc. When desired, ozone cracking in these other synthetic rubbers is inhibited by incorporating therein an antiozidant of the present invention.

The following examples are introduced to illustrate further the novelty and utility of the present invention but not with the intention of unduly limiting the same.

EXAMPLE I

N,N'-di-(2-octyl)-p-phenylene diamine, which also may be named N,N'-di-(1-methylheptyl)-p-phenylene diamine, is prepared by the reductive alkylation of p-phenylene diamine and methyl n-hexyl ketone, the latter also being named 2-octanone.

2% by weight of N,N'-di-(1-methylheptyl)-p-phenylene diamine prepared in the above manner is incorporated in a commercial rubbery butadiene-styrene copolymer composition containing the usual ingredients including carbon black, zinc oxide, sulfur, etc. The ingredients are combined on a rubber mill in the conventional manner and then the mix is cured.

Upon exposure to ozone in a concentration of 70 parts of ozone to 100 million parts of air, the rubber containing the N,N'-dioctyl-p-phenylene diamine underwent little or no cracking in contrast to the considerable cracking encountered with a similar sample of rubber not containing the additive.

EXAMPLE II

N,N'-di-4-(2,6-di-methylheptyl)-p-phenylene diamine, which also may be named N,N'-di-(4-nonyl)-p-phenylene diamine and N,N'-di-(1-isobutyl-3-methylbutyl)-p-phenylene diamine, is prepared by the reductive alkylation of p-phenylene diamine with di-isobutyl ketone. The resulting additive is incorporated in a concentration of 1.75% by weight in a synthetic rubber mixture similar to that described in Example I, and serves to retard cracking of the rubber produced therefrom.

EXAMPLE III

N,N'-di-(1-ethyl-3-methylpentyl)-p-phenylene diamine, herein referred to as N,N'-dioctyl-p-phenylene diamine, was prepared by the reductive alkylation of p-phenylene diamine with 5-methyl-3-heptanone.

One part by weight, per 100 parts by weight of GR-S, of N,N'-dioctyl-p-phenylene diamine prepared in the above manner was incorporated in a sample of GR-S rubber prior to curing. The base rubber formulation comprised the following:

| | |
|---|---:|
| GR-S-1500 | 100.00 |
| Zinc oxide | 3.00 |
| Stearic acid | 2.00 |
| HAF black | 50.00 |
| Circosol 2XH | 5.00 |
| Santocure | 1.25 |
| Sulfur | 1.80 |
| | 163.05 |

After finishing of the sample, it was tested by being exposed to the weather on a laboratory roof.

For comparative purposes, another test was made utilizing N,N'-diamyl-p-phenylene diamine as the additive in another sample of the same rubber described above. This additive was used in the same concentration (one part by weight per 100 parts by weight of GR-S) and was tested at the same time and in the same manner as the first mentioned sample.

The accompanying photographs, designated as Figure 1 of the drawing, were made of the two samples of the rubber after 180 hours exposure to the weather. It will be noted that the sample containing the N,N'-dioctyl-p-phenylene diamine has substantially no cracks, while the sample containing the N,N'-diamyl-p-phenylene diamine shows considerable cracking. The cracks in the sample containing N,N'-diamyl-p-phenylene diamine began to appear after 24 hours exposure.

Additional tests conducted with other samples containing these additives showed substantially the same results. These other tests were conducted in accordance with ASTM–D1149 bent loop test procedure. The samples were observed after 86½ hours exposure to ozone.

EXAMPLE IV

This example reports an additional run made with N,N'-di-(1-ethyl-3-methylpentyl) - p-phenylene diamine, referred to herein as N,N'-dioctyl-p-phenylene diamine, in a different GR-S formulation. The example also includes data obtained with N,N'-di-(1-methyloctyl)-p-phenylene diamine, herein referred to as N,N'-dinonyl-p-phenylene diamine.

The data reported herein were obtained with a base rubber formulation comprising the following:

| | |
|---|---:|
| GR-S-1505 | 100.00 |
| Zinc oxide | 3.00 |
| Stearic acid | 2.00 |
| Philblack A | 50.00 |
| Santocure | 1.00 |
| Sulfur | 1.75 |
| Neozone D | 1.00 |
| AgeRite resin D | 1.00 |
| | 159.75 |

After incorporation of the antiozidants, the compositions were milled and cured in accordance with procedures in ASTM–D15–52T.

The various samples were tested both in an azone cabinet and by exposure to the outdoors. The additive compounds were utilized in a concentration of three parts by weight of the additive per 100 parts by weight of GR-S.

The results reported in the following table were obtained after seven months of testing. The tests were being continued but later results were not available.

*Table I*

| Additive | Ozone Cabinet | Outdoor Exposure |
|---|---|---|
| N,N'-dioctyl-para-phenylene diamine. | Crack free after 7 months. | Crack free after 7 months. |
| N,N'-dinonyl-para-phenylene diamine. | do | Do. |

The ozone cabinet was constructed in accordance with ASTM D1149–51T and the tests were conducted at a temperature of 158° F. Both samples were tested according to ASTM D518–44, Method B, bent loop test procedure.

From the above data it will be noted that N,N'-dinonyl-p-phenylene diamine and N,N'-dioctyl-p-phenylene diamine both are very effective in preventing the ozone cracking of the rubber.

EXAMPLE V

This example illustrates the use of the antiozidant compounds of the present invention in natural rubber. The rubber used in these tests was a natural rubber black vulcanizate obtained from a commercial rubber manufacturer as a typical tire tread stock. In one series of tests, strips of 5.25" x 0.75" x 0.075" were cut from tensile slabs and were treated as follows: All samples were immersed and swollen in solutions containing toluene as the solvent. One sample was used as the control sample. N,N'-di-(2-octyl)-p-phenylene diamine, herein referred to as N,N'-dioctyl-p-phenylene diamine, was incorporated in a second sample. N,N'-di-(2-nonyl)-p-phenylene diamine, herein referred to as N,N'-dinonyl-p-phenylene diamine, was incorporated in a third sample. The additives were incorporated in the rubber by being added to the solutions in a concentration to leave within the rubber sample, after the toluene had been removed, a concentration of additive equal to 5% of the weight of the rubber in the sample. The removal of toluene was accomplished by exposure to air at room temperature for 2 hours, followed by heating for one hour at 90–100° C. in an air oven.

The samples, after cooling, were elongated 20% and mounted on a waxed wooden panel. After a period of 16 hours in this extended condition, the samples were exposed to air containing 77 part per hundred million of ozone at 37–38° C. for 4 hours. Within 24 hours after removal from the ozone cabinet the samples were elongated 50% and photographed.

Figure 2:
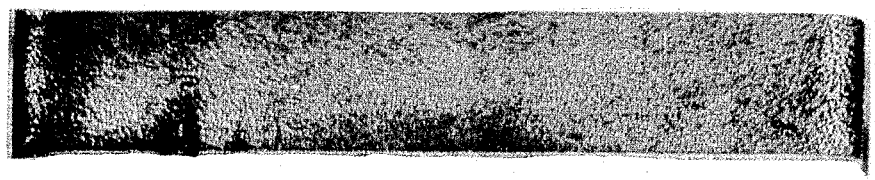
Figure 2:
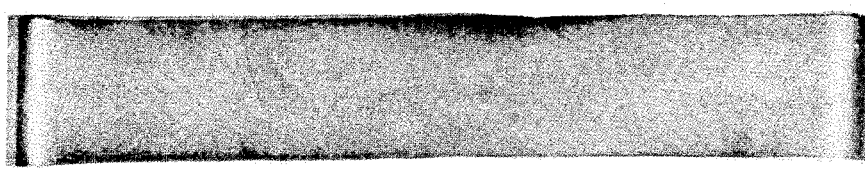
Figure 2:
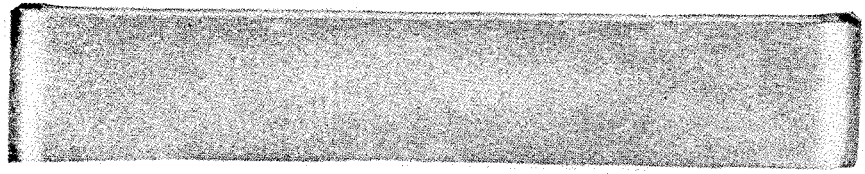

Photographs of the samples treated in the above manner are attached and are identified as Figure 2 of the drawing. It will be noted that the control sample underwent substantial cracking. On the other hand, the samples containing N,N'-dioctyl-p-phenylene diamine and N,N'-dinonyl-p-phenylene diamine underwent substantially no cracking.

Another series of tests was conducted in substantially the same manner described hereinbefore except that the samples were prepared as strips of 5.25" x 0.50" x 0.075" and that, after removal of the toluene, the samples were aged at about 90° C. for about 19 hours to simulate conditions encountered during actual use. The samples were cooled, elongated, mounted on a panel and exposed to ozone for 96 hours at the manner hereinbefore described.

Figure 3:
Figure 3:

Photographs of these samples are attached and are identified as Figure 3. The sample with N,N'-dipentyl-p-phenylene diamine (N,N'-diamyl-p-phenylene diamine) contained the additive in a concentration of 5.12% by weight of the rubber. The sample with N,N'-dioctyl-p-phenylene diamine contained the additive in a concentration of 4.35% by weight of the rubber. It will be noted that the sample having the N,N'-dioctyl-p-phenylene diamine contained a lower concentration of additive.

Referring to Figure 3, it will be noted that the sample containing the N,N'-dipentyl-p-phenylene diamine underwent substantial cracking. On the other hand, the sample containing the N,N'-dioctyl-p-phenylene diamine underwent substantially no cracking.

EXAMPLE VI

This example reports results obtained when using N,N'-di-(2-octyl)-p-phenylene diamine, referred to herein as N,N'-dioctyl-p-phenylene diamine, and N,N'-di-(2-decyl)-p-phenylene diamine, referred to herein as N,N'-didecyl-p-phenylene diamine, in synthetic rubber. The example also compares the results obtained with the above two antiozidants of the present invention with the results obtained when using N,N'-diheptyl-p-phenylene diamine, as well as those obtained with a control sample; that is, a sample of the rubber as received and not containing any of the additives mentioned above.

The rubber used in these examples is a synthetic GR–S rubber being manufactured by one of the rubber companies and marketed for commercial use. The rubber was cut into strips of 6.00" x 0.75" x 0.075". In the samples containing additive, the additive was incorporated into the sample in the same manner as described in Example V; namely, the samples were immersed and swollen in solutions containing toluene as the solvent. The additive was incorporated in the rubber by being added to the solution in a concentration to leave within the rubber sample, after the toluene had been removed, a concentration of additive of about 2 to 2.5% by weight of the rubber hydrocarbon in the sample. In these runs, the toluene was removed by exposure to air at room temperature for 24 hours, followed by heating for one hour at 90° C. in an air oven. The samples were aged at about 90° C. for about 19 hours to simulate conditions encountered during actual use. The samples were cooled, elongated 20% and mounted on a waxed wooden panel. The samples then were exposed to air containing about 70 parts per 100 million parts of ozone at 37–38° C. for 22 hours. Within 24 hours after removal from the ozone cabinet, the samples were elongated 40% and photographed. The sample containing N,N'-diheptyl-p-phenylene diamine contained 2.45 parts by weight of this additive per 100 parts of rubber hydrocarbon. The sample containing N,N'-dioctyl-p-phenylene diamine contained 2.39 parts by weight of this additive per 100 parts of rubber hydrocarbon. The sample containing N,N'-didecyl-p-phenylene diamine contained 2.14 parts by weight of this additive per 100 parts of rubber hydrocarbon.

Figure 4:
Figure 4:
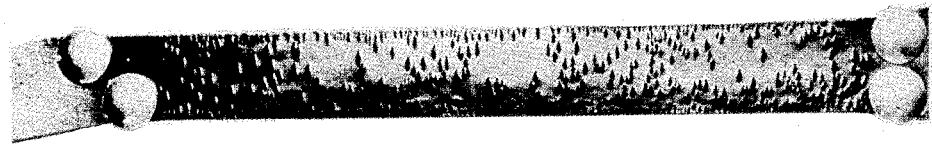
Figure 4:
Figure 4:

Referring to Figure 4, it will be noted that both the control sample and the sample containing N,N'-diheptyl-p-phenylene diamine underwent considerable cracking. The cracks in the sample containing N,N'-diheptyl-p-phenylene diamine were fewer but deeper than in the control sample. The lips of the deeper cracks protruded upward and, therefore, the cracks appear as mounds in the photograph. On the other hand, it will be noted that the samples containing N,N'-dioctyl-p-phenylene diamine and N,N'-didecyl-p-phenylene diamine underwent substantially no cracking.

We claim as our invention:

1. A method of stabilizing a rubbery polymer of a conjugated 1,3-diene normally subject to cracking by the action of ozone which comprises incorporating therein, in concentration of from about 1% to about 5% by weight to retard the cracking effect of ozone on the rubber, an N,N'-di-sec-alkyl-p-phenylene diamine in which each of the alkyl groups contains from 8 to 9 carbon atoms.

2. A method of stabilizing a rubbery polymer of a conjugated 1,3-diene normally subject to cracking by the action of ozone which comprises incorporating therein a concentration of from about 1% to about 5% by weight of N,N'-di-sec-octyl-p-phenylene diamine to retard the cracking effect of ozone on the rubber.

3. A method of stabilizing a rubbery polymer of a conjugated 1,3-diene normally subject to cracking by the action of ozone which comprises incorporating therein a concentration of from about 1% to about 5% by weight of N,N' - di - (1 - ethyl - 3 - methylphenyl) - p - phenylene diamine.

4. A method of stabilizing a rubbery polymer of a conjugated 1,3-diene normally subject to cracking by the action of ozone which comprises incorporating therein a concentration of from about 1% to about 5% by weight of N,N'-di-(1-methylheptyl)-p-phenylene diamine.

5. A method of stabilizing a rubbery polymer of a conjugated 1,3-diene normally subject to cracking by the action of ozone which comprises incorporating therein a concentration of from about 1% to about 5% by weight of N,N'-di-sec-nonyl-p-phenylene diamine to retard the cracking effect of ozone on the rubber.

6. The method of claim 1 further characterized in that said rubber is a copolymer of butadiene and styrene.

7. The method of claim 2 further characterized in that said rubber is a copolymer of butadiene and styrene.

8. A rubbery polymer of a conjugated 1,3-diene normally subject to cracking by the action of ozone containing, in concentration of from about 1% to about 5% by weight to retard the cracking effect of ozone on the rubber, an N,N'-di-sec-alkyl-p-phenylene diamine in which each of the alkyl groups contains from 8 to 9 carbon atoms.

9. A rubbery copolymer of butadiene and styrene containing a concentration of from about 1% to about 5% by weight of N,N'-di-sec-octyl-p-phenylene diamine to retard the cracking effect of ozone on said copolymer.

10. A rubbery copolymer of butadiene and styrene containing a concentration of from about 1% to about 5% by weight of N,N'-di-(1-ethyl-3-methylpentyl)-p-phenylene diamine.

11. A rubbery copolymer of butadiene and styrene containing a concentration of from about 1% to about 5% by weight of N,N'-di-(1-methylheptyl)-p-phenylene diamine.

12. A rubbery copolymer of butadiene and styrene containing a concentration of from about 1% to about 5% by weight of N,N'-di-sec-nonyl-p-phenylene diamine to retard the cracking effect of ozone on said copolymer.

13. A method of stabilizing a rubbery polymer of a conjugated 1,3-diene normally subject to cracking by the action of ozone which comprises incorporating therein, in concentration of from about 0.001% to about 10% by weight to retard the cracking effect of ozone upon the rubber, N,N'-di-sec-alkyl-p-phenylene diamine in which each of the alkyl groups contains from 8 to 9 carbon atoms.

14. A rubbery polymer of a conjugated 1,3-diene normally subject to cracking by action of ozone containing, in concentration of from about 0.001% to about 10% by weight to retard the cracking effect of ozone upon the rubber, N,N'-di-sec-alkyl-p-phenylene diamine in which each of the alkyl groups contains from 8 to 9 carbon atoms.

References Cited in the file of this patent

UNITED STATES PATENTS

| | | |
|---|---|---|
| 2,067,686 | Semon | Jan. 12, 1937 |
| 2,692,288 | Bell et al. | Oct. 19, 1954 |

OTHER REFERENCES

Shaw et al.: Rubber World, vol. 130, August 1954, "Antiozidants for GR–S Rubber," page 638.

UNITED STATES PATENT OFFICE
CERTIFICATE OF CORRECTION

Patent No. 2,867,604 January 6, 1959

Robert H. Rosenwald et al.

It is hereby certified that error appears in the printed specification of the above numbered patent requiring correction and that the said Letters Patent should read as corrected below.

Column 8, line 9, for "methylphenyl" read -- methylpentyl --

Signed and sealed this 28th day of June 1960.

(SEAL)
Attest:
KARL H. AXLINE
Attesting Officer

ROBERT C. WATSON
Commissioner of Patents